Figure 1:
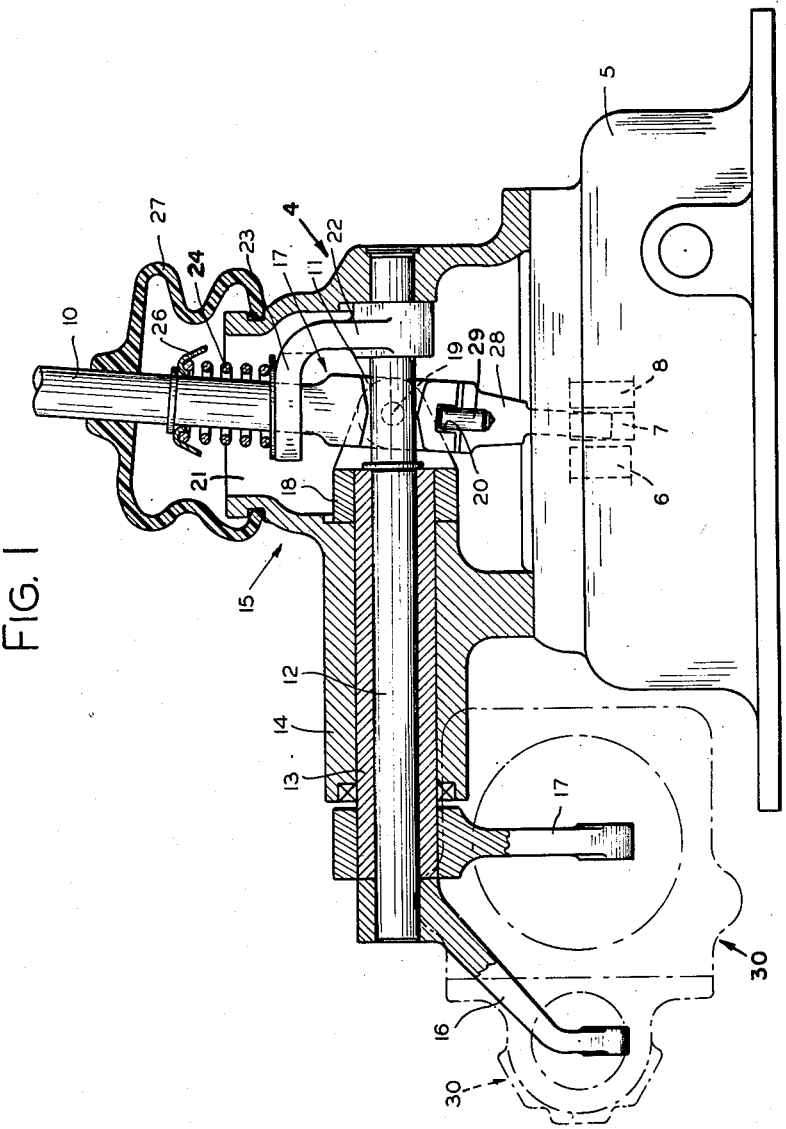

March 1, 1960 W. F. LEONARD 2,926,539
POWER SHIFTING MECHANISM
Filed Dec. 24, 1957 2 Sheets-Sheet 1

INVENTOR.
WILLIAM F. LEONARD
BY
ATTYS.

March 1, 1960

W. F. LEONARD 2,926,539

POWER SHIFTING MECHANISM

Filed Dec. 24, 1957

2 Sheets-Sheet 2

INVENTOR.
WILLIAM F. LEONARD
BY
ATTYS.

United States Patent Office 2,926,539
Patented Mar. 1, 1960

2,926,539

POWER SHIFTING MECHANISM

William F. Leonard, Jackson, Mich., assignor to Clark Equipment Company, a corporation of Michigan Application December 24, 1957, Serial No. 704,978

8 Claims. (Cl. 74—364)

This invention relates to power shifting mechanisms having utility, for example, for actuating multi-shift transmissions for self-propelled vehicles.

In the operation of heavy duty self-propelled vehicles, such as, by way of example, industrial trucks, earth moving and road building machines, it is desirable that the operator have at his command the ready and facile manual selection of required gear ratios of drive and direction of drive through the transmission of the vehicle to maintain a selected drive ratio independent of speed or torque conditions of the vehicle or transmission. Further, in vehicles of the character having heavy duty transmissions the physical exertion required in normal shifting operations can become burdensome to the end that the operator is not capable of achieving full and efficient performance of the vehicle under his control.

Accordingly, it is an object of the present invention to provide power shifting mechanism having means subject to manual control to perform a desired shifting operation and which, when actuated, brings into play a power source to effect or assist the selected shifting operation.

Thus, in a power shifting mechanism of my invention, when utilized with a multi-shift transmission of a vehicle, the manual selection of a predetermined shift to provide a desired direction and gear ratio of drive, affords force in effecting the selected gear shifting operation.

In the operation of a vehicle having a multi-shift transmission as above mentioned, it is desirable for the operator or driver of the vehicle to be sensitive to actuation of the transmission, and it is therefore a further object of the invention to provide a power shifting mechanism in which the operator or driver maintains a sense of feel of manually making the selected shift.

It is a further object of the invention to provide a power shifting mechanism as last mentioned in which, if the operator or driver fails to follow through the complete manual shifting movement, the power shifting mechanism is then rendered inactive.

In order to achieve the aforementioned objects of the invention, there is provided a motor preferably in the form of a power piston and power cylinder adapted to have connection through control valve means with a suitable source of fluid pressure to move the power piston within the power cylinder. The power piston, in turn, is adapted to be associated with a multi-speed transmission so as to effect appropriate movement of the shifter rails of the transmission, as desired by the operator. The aforementioned control valve means preferably comprises relatively movable valve and valve seat means and in which the valve means is movable manually by the operator or driver of the vehicle relative to the valve seat means in the act of moving a suitable manually operable gear shift lever to make a selected shift. Such movement of the manually operable gear shift lever effects loading of the valve means, as by spring means, to impart a feeling of shifting to the operator or driver, and also affords connection of the power cylinder for the power piston with the source of fluid under pressure, so that the power piston drives the selected shift rail to its shifted position. The aforementioned relatively movable valve means and valve seat means are arranged so that if the operator or driver releases the manually operable gear shift lever before completing the initiated gear shift, relative movement occurs between the valve means and valve seat sleeve means so as to connect the source of fluid under pressure to the power cylinder to both sides of the power piston and thus discontinue further movement of the power piston until such time as the operator or driver again actuates or moves the manually operable gear shift lever.

A preferred feature of the invention concerns the provision in the aforedescribed arrangement of parts of connecting means for securing the power piston means with the aforementioned valve seat sleeve means for conjoint movement, and in which such connection means affords a lost motion connection between the valve means and valve seat sleeve means so that when movement of the valve means ceases the aforementioned spring means disposes the valve means and the valve seat sleeve means in positions relative to each other to terminate movement of the power piston means and valve seat sleeve means.

A still further preferred feature resides in the arrangement of the power piston, power cylinder and the control valve means, so that upon completion of a shifting operation pressure from the source of pressure is admitted to the power cylinder at opposite ends of the power piston so that the latter is maintained in its shifted position.

A still further feature resides in the provision of valve seat sleeve means in the form of a hollow sleeve and in which the valve means comprises a rod mounted for axial movement in the sleeve together with slot and pin means between the valve seat sleeve means and valve to provide the aforesaid lost motion connecting means between the valve seat sleeve means and the valve means.

A still further feature resides in the provision of control means at last noted in which spring means are provided adjacent opposite ends of the valve seat sleeve means and the valve means to normally dispose the valve means in position relative to the valve seat sleeve means to admit fluid under pressure to the power cylinder at opposite ends of the power piston.

A still further feature resides in the provision of an arrangement of control valve means and passageway means so that when the control valve means is actuated to admit fluid under pressure to the power cylinder opposite one end of the power piston, the other portion of the power cylinder opposite the other end of the power piston is vented or connected to sump, and in which, when the control valve means is operative to admit fluid under pressure to the power cylinder opposite both ends of the power piston, no portion of the power cylinder is vented or connected with sump.

Further objects and features of the invention will appear from the following detailed description.

Now, in order to acquaint those skilled in the art with the manner of constructing and utilizing power shifting mechanisms in accordance with the present invention, I shall, in conjunction with the accompanying drawings, describe a preferred embodiment of my invention.

Figure 2:
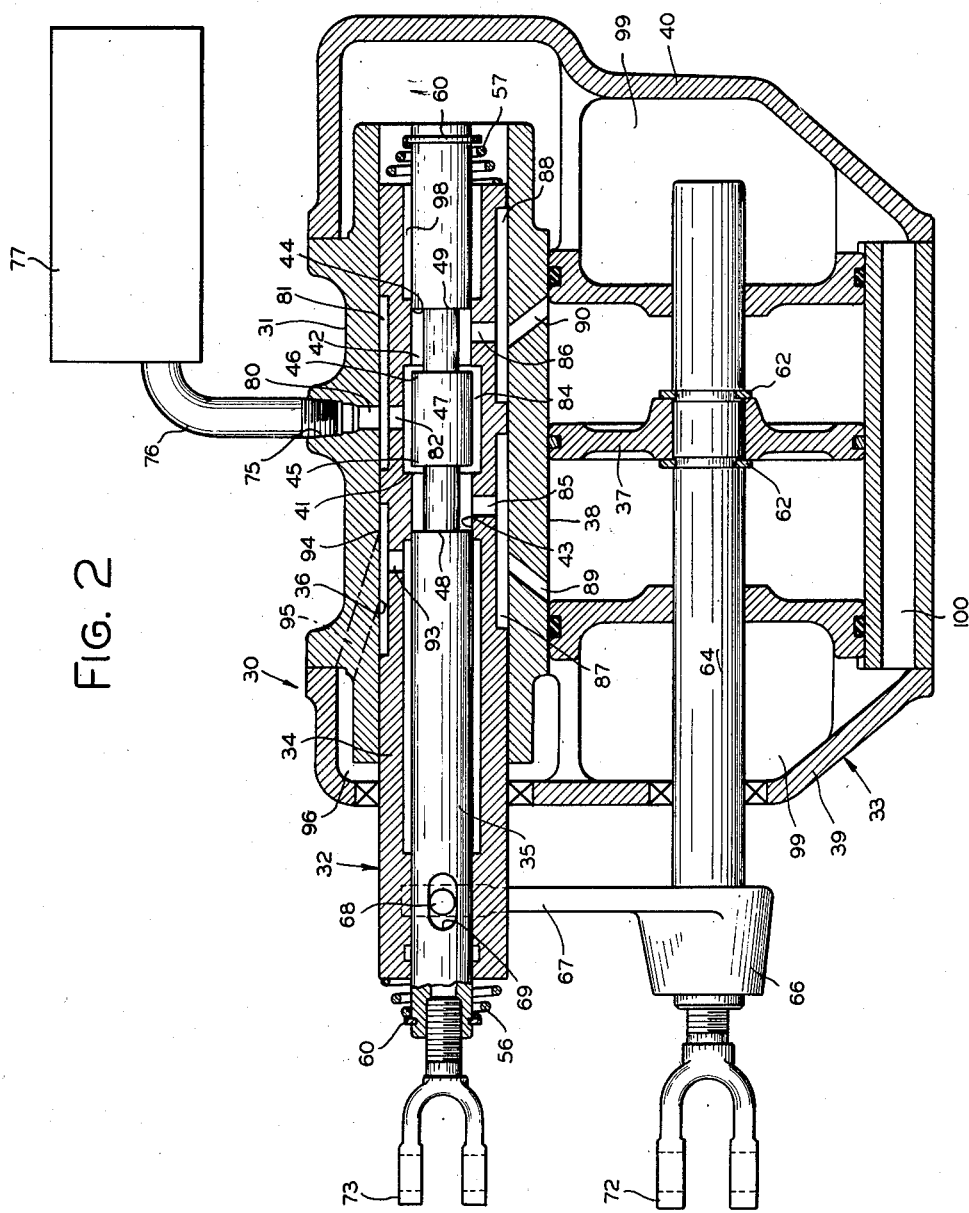

In the drawings:

Figure 1 is a view partly in elevation and partly in section showing one form of gear shift lever mechanism and portion of a conventional multi-speed transmission with which the power shift mechanism of the present invention has utility; and Figure 2 is a longitudinal central sectional view of a power shift mechanism constructed in accordance with the principles of my present invention.

Referring now to the drawings, there is shown in Figure 1 a gear shift lever mechanism 4 arranged in a conventional manner with the housing 5 of any suitable known multi-shift transmission. Within the transmission housing 5 there is arranged a plurality of movable shifter members or shifter rails, indicated at 6, 7 and 8, respectively. These shifter members or shifter rails may follow conventionally known constructions and provide for the selection of the direction of drive and various drive ratios through the gear trains of the transmission by sliding movement thereof in opposite directions from a neutral position. In known transmissions, a plurality of shifter rails, such as indicated at 6, 7 and 8, are provided so that one shifter rail, for example rail 6, upon movement in one direction from a neutral position, affords reverse drive through the transmission and, upon movement of the shifter rail 6 in the other direction from neutral position, affords a selected ratio of forward drive through the transmission. In the particular instance noted, the other two shifter rails 7 and 8 are each adapted by like movement in opposite directions from neutral positions to afford two different forward drive ratios through the transmission.

The gear shift lever mechanism 4, as shown, comprises a gear shift lever 10 disposed for the convenient manual manipulation by the operator or driver of a vehicle in which the gear shift lever mechanism and associated transmission are arranged. As shown, the gear shift lever 10 adjacent its lower end is formed with a bell opening 11 through which an operating shaft 12 extends. The shaft 12, as shown, is mounted in a sleeve 13 which, in turn, is journaled in a tubular extension 14 of the gear shift lever mechanism housing, indicated generally at 15. One end of operating shaft 12 projects beyond the sleeve 13 and has a valve shift crank 16 secured thereto, and adjacent valve shift crank 16 a power piston crank 17 is secured to one end of sleeve 13. The end of the shaft 12 opposite the end to which the valve shift crank 16 is connected is mounted for rotation in a suitable bore provided in the housing 15. As shown, the end of sleeve 13 opposite power piston crank 17 projects into the bell chamber 21 of the housing 15 and has a clevis 18 secured thereto and to which the gear shift lever 10 has pivotal connection about an axis transverse to the longitudinal axis of the operating shaft 12 by a known arrangement of pin means 19 which engage in suitable slot 20 formed in the lower end of lever 10. As shown, a bracket 22 is secured to shaft 12 adjacent lever 10 and has a yoke portion 23 encompassing the gear shift lever 10. Spring means, indicated generally at 24, extends between the yoke portion 23 of the bracket 22 and a spring seat member 26 secured to lever 10 affords spring loading of the gear shift lever 10. A flexible rubber boot of conventional construction, shown at 27, extends between the gear shift lever 10 and the open upper end of chamber 21 of the housing 15 to protect the enclosed parts from dirt or the like. At the lower end of the gear shift lever 10 there is arranged in a known manner a shift finger 28 which carries a pin 29 fitting into the aforementioned slot 20, and which is adapted to be laterally positioned, selectively, for engaging any one of the shifter members 6, 7 and 8 of the transmission in the neutral position of the latter.

In the construction above described, it will be observed that the gear shift lever 10 may be rocked, selectively, about the axis of pins 19 to align the shift finger 28 with any one of the three transmission shifter rails 6, 7 and 8, and upon turning movement of the lever 10 about the axis of the operating shaft 12 rotary movement is imparted to the latter via the bracket 22, so that the selected shifter rail may be moved in one direction or the other from its neutral position to effect actuation of the transmission as already mentioned.

The power shift mechanism 30, which may be typically associated with the aforedescribed gear shift lever mechanism and transmission, is shown in greater detail in Figure 2. As shown, the power shift mechanism 30 includes a casing 31 for receiving a control valve means or assembly, indicated generally at 32, and a power piston and power cylinder assembly, indicated generally at 33. The control valve means 32, as shown, comprises a suitable valve seat sleeve means, which in the embodiment of the invention disclosed is in the form of a power tube or valve seat sleeve 34 which receives for sliding engagement therein valve means in the form of a valve rod 35. The valve seat sleeve 34, as shown, is mounted in a control valve cylinder formed by a cylindrical bore 36 in casing 31 and the power piston 37 of the power piston and power cylinder means 33 is mounted in a cylindrical bore 38, defining a power cylinder, in casing 31, it being observed that the cylinder 36 and cylinder 38 lie on spaced apart parallel axes. Suitable end cap members 39 and 40 are mounted at opposite ends of the casing 31 to enclose most of the parts of the power shifter mechanism.

Referring again to the valve seat sleeve 34, it will be observed that it is provided with a first pair of cylindrical valve seats, indicated at 41 and 42, respectively, and a second pair of cylindrical valve seats, indicated generally at 43 and 44, respectively. The valve rod 35 comprises a first pair of cylindrical valves 45 and 46 at opposite ends of a valve element 47 formed intermediate the ends of the valve rod 35, with the valves 45 and 46, respectively, being adapted to have opening and closing engagement with valve seats 41 and 42. Additionally, the valve rod 35 is provided with a second pair of cylindrical valves 48 and 49 which are adapted to have opening and closing engagement with cylindrical valve seats 43 and 44.

The valve rod 35 is normally disposed with respect to valve seat sleeve means 34 with the valve element 47 in position so that the valves 45 and 46 are in open relation with respect to the valve seats 41 and 42, respectively, and with the valves 48 and 49 in closed relation with valve seats 43 and 44, respectively, by means of a pair of balanced coil springs 56 and 57 arranged between the opposite adjacent ends of the valve rod 35 and valve seat sleeve 34. As shown, the inner ends of springs 56 and 57 are seated against the outer end surfaces of valve seat sleeve 34 and the other ends abut against suitable snap rings 60 carried adjacent the outer ends of the valve rod 35.

As previously mentioned, the power piston 37 is mounted within the power cylinder 38, and the power piston 37 is secured by lock rings 62—62 to a piston rod 64. The piston rod 64 has connecting means 66 in the form of a bracket secured at one end thereto. The other end of bracket 66 is formed with a bifurcated end yoke portion 67 through which the valve seat sleeve 34 projects. A pin 68 mounted at its opposite ends in the pair of arms of the yoke 67 secures the valve seat sleeve 34 to the bracket 66 so that the valve seat sleeve moves conjointly with the piston rod 64 and power piston 37. It will be observed also that the pin 68 projects through an elongated slot 69 extending axially of valve rod 35 to form a lost motion connection between the valve rod 35 and the valve seat sleeve 34. The slot 69 is arranged so that in the neutral position of the parts shown in Figure 2, with the springs 56 and 57 in balanced condition, the pin 68 is disposed intermediate and centrally of the ends of slot 69.

The outer end of piston rod 64 projecting outwardly of end cap member 39 has a clevis 72 secured thereto which is adapted to have connection with the sleeve 13. Also it will be seen that the adjacent end of valve rod 35 has a clevis 73 secured thereto, and which clevis 73 has connection with the valve operating shaft 12.

The casing 31 is provided with a fluid inlet opening 75 which is adapted to have connection by means of a suitable conduit 76 with a source of fluid under pressure, indicated diagrammatically at 77. The fluid pressure source may be either hydraulic or pneumatic as may be found in conventional self-propelled vehicles having pump means providing such power sources. The casing 31 and valve seat sleeve 34 are provided with suitable ports and grooves to provide passageway means for connecting the power cylinder 38 at opposite ends of the power piston 37 with the source of fluid under pressure or to vent or sump as the case may be. The aforesaid passageway means includes a bore 80 in casing 31 communicating with inlet 75, with the bore extending to a groove 81 formed in the outer periphery of and extending axially of the valve seat sleeve 34. The groove 81, in turn, connects with a bore 82 opening into an annular chamber 84 within which the valve element 47 of the valve rod 35 is disposed. Valve seats 41 and 42 control communication of chamber 84 with bores 85 and 86, respectively, which communicate with grooves 87 and 88 formed in the periphery and extending axially of the valve seat sleeve 34. Ports 89 and 90 formed in casing 31 connect grooves 87 and 88 to the power cylinder at opposite ends of the power piston 37. Further, it will be noted that the valve seat sleeve 34 includes a vent port 93 which communicates with a peripheral and axially extending groove 94 therein, and which groove 94, in turn, is in communication with a port 95 in casing 31 leading to a port 96 formed in the end cap member 39, so as to provide for venting the cylinder 38 opposite one end of the power piston 37 to atmosphere. Additionally, it will be seen that the port 90 through slot 88 and bore 86 is adapted to have communication with a bore 98 formed in the end of valve seat sleeve 34 adjacent spring 57 through valve seat 44 to vent the cylinder opposite the other end of piston 37. In the arrangement described, if air under pressure constitutes the pressure source, it is desirable to vent to atmosphere, selectively, the power cylinder at opposite ends of the power piston. When liquid, such as oil, under pressure is used as the source of fluid under pressure, it is, of course, desirable to return liquid discharged from the power cylinder to sump and, accordingly, in such instance the end cap members 39 and 40 are appropriately formed with chambers 99 to collect fluid discharged from the power cylinder 38, and which chambers 99 may be connected together by a bore 100 formed in casing 31 and leading to a liquid sump for the hydraulic system affording the liquid under pressure.

In the position of the parts shown in Figure 2, and by reason of the passageway means above described, it will be observed that fluid under pressure from the source of fluid under pressure is adapted to be admitted to the power cylinder 38 at opposite ends of the power piston 37, so that the power piston is retained in the position shown. However, if the valve rod 35, for example, is shifted to the left, valve seat 41 will be closed by valve 45 so that fluid under pressure is admitted through open valve seat 42 to the power cylinder 38 at the right-hand end of the power piston 37. Additionally, valve 48 will be disposed in open relation to valve seat 43 so that power cylinder 38 at the left-hand end of power piston 37 is vented or connected to sump. By virtue of such operation, the power piston 37 and connected parts, together with valve sleeve 34, are moved to the left. If the valve rod 35 is moved to the right, it will then be observed that the valve 46 is disposed in closed relation with respect to valve seat 42 and valve 49 is disposed in open relation to valve seat 44, whereupon fluid under pressure is admitted through the passageway means above described to power cylinder 38 opposite the left-hand end of power piston 37 and the power cylinder 38 to the right-hand end of power piston 37 is vented or connected with sump so that the power piston 37, the power piston rod 64 and the valve seat sleeve 34 are shifted to the right.

By reason of the aforedescribed construction of gear shift lever mechanism and power shift mechanism, it will be observed that the shift lever 10 may be manually manipulated by the driver or operator of a vehicle about pivot pin means 19 to dispose the shift finger 28 in desired relation with respect to any of the shifter members or shifter rails 6, 7 and 8. Then, upon the operator imparting movement to the lever 10 to rotate shaft 12 in one direction or the other, it will be observed that the valve rod 35 will be moved linearly to the left or right. Assuming, for purposes of illustration, that the shift lever 10 has been arranged to shift shifter member 6 to effect desired actuation of the transmission so as to result in movement of the valve rod 35 to the left, coil spring 56 will be placed under compression and the valve rod 35 will move to the left relative to valve seat sleeve 34 as afforded by the lost motion connection between pin 68 and slot 69. Under such circumstances, fluid under pressure will, through the passageway means above described, be admitted opposite one end of power piston 37, i.e., the right-hand end of power cylinder 38, and the left-hand end of the power cylinder 38 opposite the other end of power piston 37 will be connected to vent. Under such circumstances, the power piston 37, piston rod 64 and valve seat sleeve 34 are moved to the left. Such movement of the piston rod 64 through clevis 72 at the end thereof applies force to the power shaft crank 17 which, in turn, rotate the sleeve 13 to powershift the selected rail in the desired direction. It is to be observed that the operator of the vehicle is required to maintain nominal force on the shift lever 10 in the direction of the aforementioned shift in order to maintain the spring 56 under compression in order to effect the shift. Should the operator release the shift lever 10 before completion of the shift, spring 56 will restore valve rod 35 to its normal position with respect to valve seat sleeve 34, as illustrated in Figure 2, and thus admit fluid under pressure from the pressure source to the cylinder 38 at opposite ends of the power piston 37 and interrupt movement of the latter. Thus, it will be observed by virtue of the construction described that the operator or driver of the vehicle will always maintain a sense of feel of making a shift in that, under the conditions noted, he must maintain the spring 56 under compression. Upon completion of a selected shift and as already indicated, uniform pressure is admitted to the power cylinder 38 opposite the ends of the power piston 37 so that the power piston 37 is retained in its desired shifted position. It is believed that it will be readily clear that if the shift lever 10 is actuated so as to move the valve rod 35 to the right with respect to the valve seat sleeve 34 from the position shown in Figure 2 of the drawings, that the power shift mechanism functions to move the power piston 37 and valve seat sleeve 34 to the right, as viewed in the drawing, to impart rotary movement to the sleeve 13 in a direction reverse to that above described when the valve rod 35 is moved to the left.

While I have shown what I consider to be a preferred embodiment of my invention, it will be understood that various modifications and rearrangements may be made therein without departing from the spirit and scope of my invention.

I claim:

1. Power shifting mechanism for association with a source of fluid under pressure comprising, motor means including a casing, a power cylinder in said casing, and power piston means reciprocable in said power cylinder, said casing having a control valve cylinder, control valve means movably mounted in said control valve cylinder and including valve seat means and valve means movably mounted for movement relative to each other, passageway means in said casing and said valve seat means extending from the source of fluid under pressure to said power cylinder, means connecting said power piston means with said valve seat means for conjoint movement and including lost motion connecting means between said valve seat means and said valve means, whereby upon movement of said valve means relative to said valve seat means afforded by said lost motion connecting means fluid from the source of fluid under pressure is adapted to be admitted through said passageway means in said casing and said valve seat means of said control valve means to said power cylinder to move said power piston means within said power cylinder.

2. Power shifting mechanism for association with a source of fluid under pressure comprising, motor means including a casing, a power cylinder in said casing, and power piston means reciprocable in said power cylinder, said casing having a control valve cylinder, control valve means movably mounted in said control valve cylinder and including valve seat means having a pair of spaced apart valve seats, and valve means movable relative to said valve seat means and including a valve element for opening and closing said pair of valve seats, first passageway means in said casing extending from the source of fluid under pressure to said control valve cylinder and from the latter to said power cylinder, second passageway means in said valve seat means connecting said first passageway means with said valve seats, means connecting said power piston means with said valve seat means for conjoint movement and including lost motion connecting means between said valve seat means and said valve means, biasing means between said valve seat means and said valve means for normally disposing said valve element in open relation with respect to said pair of valve seats, for admitting fluid under pressure from the source of fluid under pressure through said first and second passageway means to said power cylinder at opposite ends of said power piston and said valve means being movable relative to said valve seat means against said biasing means to dispose said valve element in closing relation to one of said valve seats and in open relation to the other of said pair of valve seats whereby fluid from the source of fluid under pressure is admitted through said first and second passageway means and the other of said valve seats to one end of said power cylinder to move said power piston within said power cylinder.

3. Power shifting mechanism for association with a source of fluid under pressure comprising, a casing, a power cylinder in said casing, a power piston mounted for reciprocal movement in said power cylinder, said casing having a control valve cylinder, control valve means mounted in said control valve cylinder and including valve seat means mounted for sliding movement therein, said valve seat means comprising a first pair of valve seats and a second pair of valve seats, and valve means mounted for movement in said valve seat means including a first pair of valve elements for opening and closing said first pair of valve seats, and a second pair of valve elements for opening and closing said second pair of valve seats, passageway means in said casing and said valve seat means extending from the source of fluid under pressure to said power cylinder and from said power cylinder to vent, said first valve elements being operable to admit fluid from the source of fluid under pressure through said passageway means to said power cylinder at opposite ends of said power piston, said second valve elements being operable to vent said power cylinder at opposite ends of said power piston through said passageway means, means connecting said power piston means for conjoint movement with said valve seat means including lost motion connecting means between said valve seat means and said valve means, spring means adjacent opposite ends of said valve seat means and said valve means to dispose normally said first valve elements in open relation to said first pair of valve seats and said second valve elements in closed position with respect to said second pair of valve seats, and said valve means being movable relative to said valve seat means against said spring means to dispose one of said first valve elements in closing relation to one of said first pair of valve seat means and to dispose one of said second valve elements in open relation to one of said second pair of valve seats, whereby fluid from said source of fluid under pressure is admitted to said power cylinder opposite one end of said power piston with the other end of said power cylinder opposite the other end of said power piston being vented.

4. Power shifting mechanism for association with a source of fluid under pressure comprising, a casing, a power cylinder in said casing, a power piston mounted for reciprocal movement in said power cylinder, a valve cylinder in said casing, a valve seat sleeve mounted for sliding movement in said valve cylinder including a first pair of valve seats and a second pair of valve seats, a valve rod mounted for sliding movement in said valve seat sleeve including a first pair of valve elements for opening and closing such first pair of valve seats and a second pair of valve elements for opening and closing said second pair of valve seats, passageway means in said casing and said valve seat sleeve extending from the source of fluid under pressure to said power cylinder and from said power cylinder to vent, said first valve elements being operable to admit fluid from said source of fluid under pressure through said passageway means to said power cylinder at opposite ends of said power piston, said second valve elements being operable to vent said cylinder at opposite ends of said power piston through said passageway means, means connecting said power piston means for conjoint movement with said valve seat sleeve including lost motion connecting means between said valve seat and said valve rod, spring means adjacent opposite ends of said valve seat sleeve and said valve, means to dispose normally said first valve elements in open relation to said first pair of valve seats and said second valve elements in closed position with respect to said second pair of valve seats, and said valve means being movable relative to said valve seat means against said spring means to dispose one of said first valve elements in closing relation to one of said first pair of valve seat means and to dispose one of said second valve elements in open relation to one of said second pair of valve seats, whereby fluid from said source of fluid under pressure is admitted to said power cylinder opposite one end of said power piston with the other end of said power cylinder opposite the other end of said power piston being vented.

5. Power shifting mechanism for association with a source of fluid under pressure comprising, a casing, a power cylinder in said casing, a power piston mounted for reciprocal movement in said power cylinder, a valve cylinder in said casing having its axis in spaced parallel relation with the axis of said power cylinder, a valve seat sleeve mounted for sliding movement in said valve cylinder and comprising a first pair of valve seats and a second pair of valve seats, a valve rod mounted for sliding movement in said valve seat sleeve including a first pair of valve elements for opening and closing said first pair of valve seats of said valve sleeve, and a second pair of valve elements for opening and closing said second pair of valve seats of said valve seat sleeve, passageway means in said casing and said valve seat sleeve extending from the source of fluid under pressure to said power cylinder and from said power cylinder to vent, said first pair of valve elements being operable to admit fluid from the source of fluid under pressure through said passageway means to said power cylinder at opposite ends of said power piston, said second valve elements being operable to vent said cylinder at opposite ends of said power piston through said passageway means, connecting means secured at one end to said power piston means, said connecting means having a yoke at its other end between the arms of which said valve seat sleeve extends, a pin extending transversely of and through said valve seat sleeve and secured at its opposite ends in the arms of said yoke, a slot in said valve rod through which said pin extends to provide a lost motion connection between said valve rod and said valve seat sleeve, spring means adjacent opposite ends of said valve seat sleeve and said valve rod to dispose normally said first valve elements in open relation to said first pair of valve seats and said second valve elements in closed position with respect to said second pair of valve seats, and said lost motion connection affording movement of said valve rod relative to said valve seat sleeve against said spring means to dispose one of said first valve elements in closing relation to one of said first pair of valve seat means and to dispose one of said second valve elements in open relation to one of said second pair of valve seats, whereby fluid from said source of fluid under pressure is admitted to said power cylinder opposite one end of said power piston with the other end of said power cylinder opposite the other end of said power piston being vented.

6. In an assembly including a multi-speed transmission and gear shift lever mechanism therefor, in which the gear shift lever mechanism includes a manually positionable gear shift lever means adapted to be disposed relative to movable shifter members to selectively engage the latter for effecting desired drives through the transmission, and a source of fluid under pressure, the combination of power shifting means for moving the shifter members of the transmission through the gear shift lever mechanism comprising, motor means including a casing, a power cylinder in said casing, and power piston means associated with the gear shift lever mechanism for moving the shifter members of the transmission, said casing having a control valve cylinder disposed between said source of fluid under pressure and said power cylinder control valve means movably mounted in said control valve cylinder and comprising valve seat means and valve means, said valve means having connection with the manually positionable gear shift lever, means connecting said power piston means with said valve seat means and including lost motion connection means between said valve seat means and said valve means, whereby movement of the gear shift lever of the gear shift lever mechanism to effect movement of a selected shifter member imparts movement to said valve means relative to said valve seat means afforded by said lost motion connecting means so that fluid under pressure from the source of fluid under pressure is admitted through said control valve cylinder to said power cylinder to effect movement of said power piston and the selected shifter member of the transmission through the gear shift lever mechanism.

7. In an assembly including a multi-speed transmission and gear shift lever mechanism therefor, in which the gear shift lever mechanism includes a manually positionable gear shift lever means adapted to be disposed relative to movable shifter members to selectively engage the latter for effecting desired drives through the transmission, and a source of fluid under pressure, the combination of power shifting means for moving the shifter members of the transmission through the gear shift lever mechanism comprising, motor means including a casing, a power cylinder in said casing, and power piston means reciprocal in said power cylinder, said piston means having connection with the gear shift lever mechanism for moving the shifter members of the transmission, said casing having a control valve cylinder disposed between said source of fluid under pressure and said power cylinder, control valve means movably mounted in said control valve cylinder including valve seat means and valve means having connection with the manually positionable gear shift lever, means connecting said power piston means with said valve seat means and including lost motion connecting means between said valve seat means and said valve means, spring means between said valve means and said valve seat means for normally maintaining them in predetermined position with respect to each other, with said control valve means affording connection of the source of fluid under pressure through said control valve cylinder with said power cylinder at opposite ends of said power piston, and said valve means being movable by manipulation of said manually positionable gear shift lever against said spring means afforded by said lost motion connecting means so that fluid under pressure from the source of fluid under pressure is admitted through said control valve cylinder to said power cylinder opposite one end of said power piston to effect movement of the latter and the selected shifter member of the transmission through the gear shift lever mechanism, and said spring means affording a sense of feel of shifting to the operator in the manipulation of the manually positionable gear shift lever in the manner to effect a selected drive through the transmission.

8. In an assembly including a multi-speed transmission and gear shift lever mechanism therefor, in which the gear shift lever mechanism includes a manually positionable gear shift lever means adapted to be disposed relative to movable shifter members to selectively engage the latter for effecting desired drives through the transmission, and a source of fluid under pressure, the combination of power shifting means for moving the shifter members of the transmission through the gear shift lever mechanism comprising, motor means including a casing, a power cylinder in said casing, and power piston means reciprocal in said power cylinder, said piston means having connection with the gear shift lever mechanism for moving the shifter members of the transmission, said casing having a control valve cylinder disposed between said source of fluid under pressure and said power cylinder, control valve means movably mounted in said control valve cylinder including valve seat means and valve means having connection with the manually positionable gear shift lever, passageway means including said control valve cylinder extending from the source of fluid under pressure to said power cylinder and from said power cylinder to vent, means connecting said power piston means with said valve seat means and including lost motion connecting means between said valve seat means and said valve means, spring means between said valve means and said valve seat means for normally maintaining them in predetermined position with respect to each other to afford connection of said power cylinder at opposite ends of said power piston with the source of fluid under pressure through said passageway means, and closing the latter to vent, and said valve means being movable by manipulation of said manually positionable gear shift lever against said spring means afforded by said lost motion connecting means so that fluid under pressure from the source of fluid under pressure is admitted to said power cylinder opposite one end of said power piston and said power cylinder opposite the other end of said power piston is vented through said passageway means to effect movement of said power piston and the selected shifter member of the transmission through the gear shift lever mechanism.

References Cited in the file of this patent

UNITED STATES PATENTS

| | | |
|---|---|---|
| 1,258,337 | Imblum | Mar. 5, 1918 |
| 2,081,527 | Breese | May 25, 1937 |